United States Patent [19]
Nuckolls et al.

[11] Patent Number: 5,216,333
[45] Date of Patent: Jun. 1, 1993

[54] STEP-DIMMING MAGNETIC REGULATOR FOR DISCHARGE LAMPS

[75] Inventors: Joe A. Nuckolls; Isaac L. Flory, IV, both of Blacksburg, Va.

[73] Assignee: Hubbell Incorporated, Orange, Conn.

[21] Appl. No.: 792,364

[22] Filed: Nov. 15, 1991

[51] Int. Cl.⁵ .............................................. G05F 1/00
[52] U.S. Cl. ..................................... 315/291; 315/277; 340/573
[58] Field of Search ................ 315/291, 277; 340/573, 340/562, 563

[56] References Cited

U.S. PATENT DOCUMENTS

| | | | |
|---|---|---|---|
| 3,925,763 | 12/1975 | Wadhwani | 340/573 |
| 4,196,429 | 4/1980 | Davis | 340/573 |
| 4,501,994 | 2/1985 | Spreadbury | 315/307 |
| 4,503,364 | 3/1985 | Engel | 315/308 |
| 4,562,384 | 12/1985 | Owen | 315/276 |
| 4,609,852 | 9/1986 | Perper | 315/278 |
| 4,754,201 | 6/1988 | Knoble et al. | 315/130 |
| 4,795,945 | 1/1989 | Mayer | 315/276 |
| 4,891,562 | 1/1990 | Nuckolls et al. | 315/277 |

Primary Examiner—Robert J. Pascal
Assistant Examiner—R. A. Ratliff
Attorney, Agent, or Firm—Jerry M. Presson; Walter C. Farley

[57] ABSTRACT

A dimming system for a discharge lamp has a magnetic regulator with first, second and third windings linked by a magnetic core, the first winding being connectable to a source of alternating current. The second winding and a starting circuit are connected to the lamp for lighting the lamp. The third winding is tapped and has a ballast capacitor connected across the winding. An inductive reactor and relay contact set are connected in series between one end of the third winding and the tap so that when the contact set closes, the reactor stores energy from the source and reduces the power to the lamp, abruptly reducing its light output. A motion-responsive detector is used to energize the relay. With a normally closed contact set, the lamp is dimmed until a moving person is detected, opening the contact set and increasing the lamp light output. Multiple lamps can be controlled simultaneously.

11 Claims, 7 Drawing Sheets

FIG. 6

OPERATING CHARACTERISTICS WITH VARIOUS REACTORS USED FOR DIMMING 400 W HPS LAMP

| DIMMING REACTOR | LAMP LUMENS | | LAMP WATTAGE | | INPUT WATTAGE | | WATTS LOSS | WATTS LOSS REDUCT. | INPUT POWER FACTOR | LPW: | | WATTS SAVED |
|---|---|---|---|---|---|---|---|---|---|---|---|---|
| | % OF NORMAL | REDUCT. | % OF NORMAL | REDUCT. | % OF NORMAL | REDUCT. | | | | LP | INPUT | |
| 70 W HQI 240 V | 84% | 16% | 91% | 9% | 91% | 9% | 65W | 3% | 97% | 91 | 78 | 40W |
| 150 W HQI 240 V | 65 | 35 | 79 | 21 | 82 | 18 | 67 | 0 | 98 | 81 | 67 | 85 |
| 200 W 240 V | 48 | 52 | 70 | 30 | 73 | 27 | 62 | 8 | 92 | 68 | 56 | 128 |
| 250 W 240 V | 36 | 64 | 62 | 38 | 66 | 34 | 57 | 15 | 80 | 57 | 47 | 163 |
| 310 W 240 V | 30 | 70 | 56 | 44 | 60 | 40 | 55 | 18 | 69 | 52 | 42 | 189 |

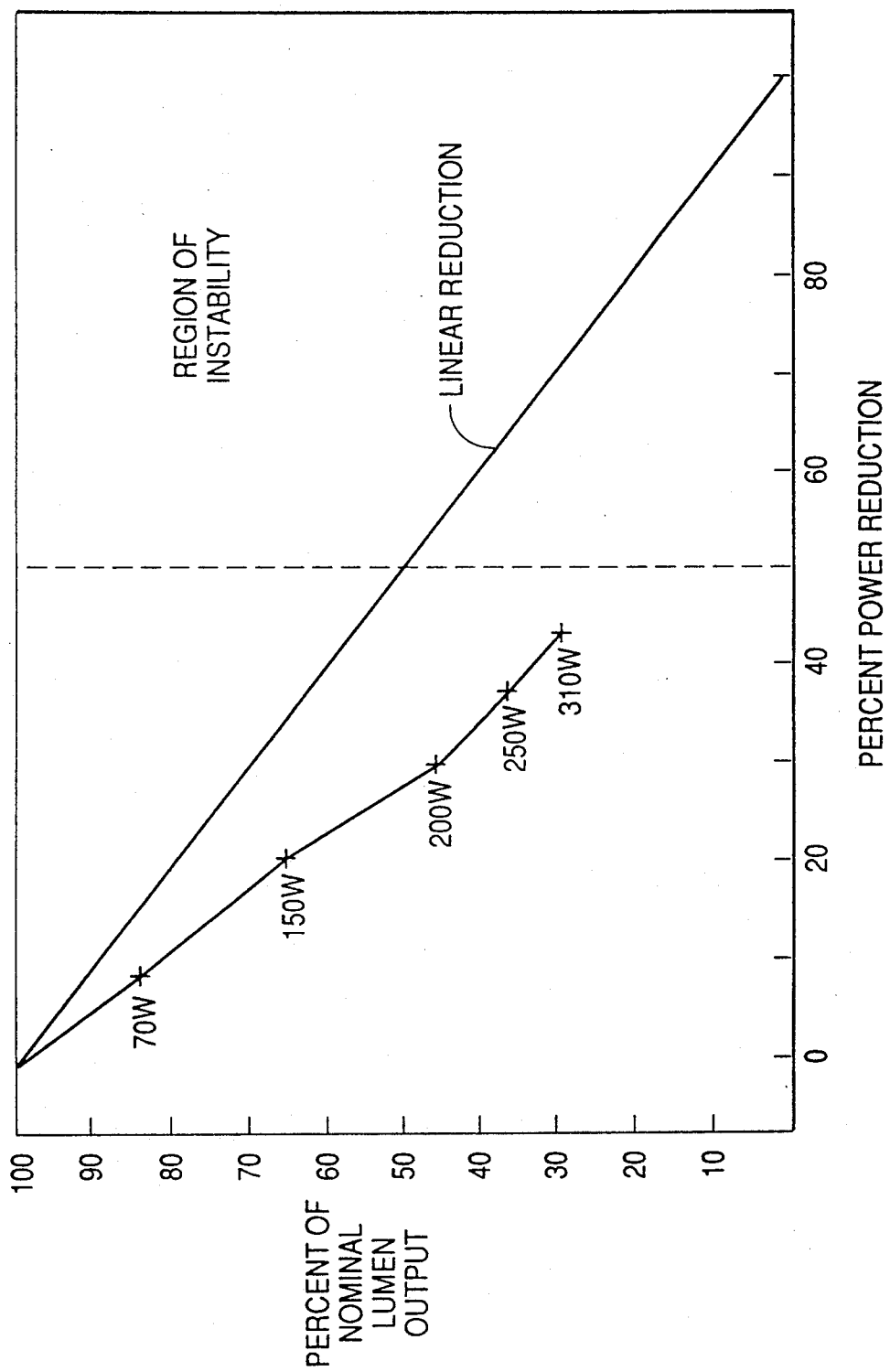

STEP-DIMMING MAGNETIC REGULATOR FOR DISCHARGE LAMPS

FIELD OF THE INVENTION

This invention relates to electrical regulator circuits for discharge lamps, particularly metal halide (MH), high pressure sodium (HPS) and other high intensity discharge (HID) lamps, which provide for selectively reducing the light output of the lamps in an energy-efficient and highly stable manner.

BACKGROUND OF THE INVENTION

A regulator-ballast circuit for HID lamps is disclosed in U.S. Pat. No. 4,891,562. In that circuit is used a magnetic regulator having three windings, one winding being connected to a lamp, another to an AC source and the third to a control circuit. The patent discloses a control technique using a switch, the firing angle of which is controlled to regulate the operating characteristics of the lamp, despite line voltage changes, lamp aging effects and other variations. It is also pointed out therein that the control circuit can be used as a lamp dimming circuit.

There are a number of circumstances in which lamp dimming is desirable and others in which power conservation is the main objective and lamp dimming is acceptable. Consider, for example, a space which is illuminated by one or more HID lamps and which is occupied sporadically. In order to save energy, it would be possible to sense that the space is unoccupied and simply deenergize the lamps completely. However, with HID lamps, restarting usually takes some time and can be difficult under some operating conditions, as well as tending to reduce lamp life. Also, in many circumstances, it would not be desirable to entirely eliminate illumination in the absence of an occupant for security or other reasons.

The dimming circuit disclosed in the above patent (FIG. 2) is capable of providing smooth dimming over a wide operating range. While that is certainly desirable for many reasons, the circuit uses a large number of components and is therefore costly. For those situations which call for reduced power usage and in which this smooth dimming is not essential, it would be preferable to employ a step system which uses fewer components, thereby reducing cost, increasing reliability and increasing the ruggedness of the apparatus.

SUMMARY OF THE INVENTION

Accordingly, an object of the present invention is to provide a simple and reliable regulator circuit for lamp operation which provides step dimming capability.

Briefly described, the invention comprises a step-dimming system for a discharge lamp including a discharge lamp and a magnetic regulator having first, second and third windings and a magnetic core linking those windings. The first winding is connectable to a source of alternating current. The second winding and a starting circuit are connected to the lamp for delivering energy from the AC source to the lamp to thereby cause the lamp to produce light. The third winding has a ballasting and energy storage capacitor connected across it and it has a tap to reduce the high voltage switching requirement. An inductive dimming energy storage reactor and a switching device are connected in series with each other, the reactor and switching device being connected between one end of the third winding and the tap so that when the switching device is conductive, the reactor stores energy taken from the capacitor each half cycle and reduces the power available for delivery to the lamp, abruptly reducing the light output from the lamp. Circuit means for controlling the conductive state of the switching device includes a standard electrical switch or means responsive to the presence of a person in a selected area to render the switching device non-conductive, thereby opening the circuit including the inductive reactor and abruptly increasing the light output from said lamp.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this disclosure, and wherein:

FIG. 6 is a table of reactor components; and

FIG. 7 is a graph showing the relationship of dimming characteristics of various components.

DESCRIPTION OF THE PREFERRED EMBODIMENTS

Figure 1:
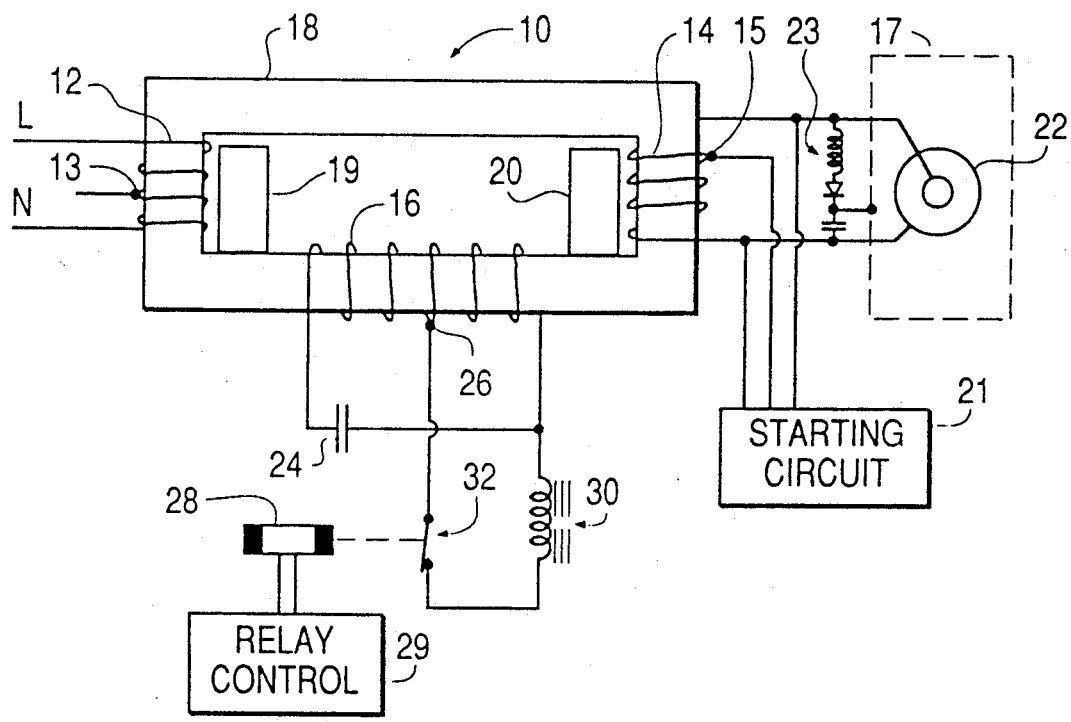
FIG. 1 is a schematic circuit diagram, partly in block form, of a regulator circuit in accordance with the invention having a dimming function.

Referring first to FIG. 1, a magnetic regulator indicated generally at 10 includes a primary winding 12 which has line and neutral wires L and N connectable to an AC source, preferably 240 VAC. Winding 12 also has a center tap 13 at which about 120 VAC appears. The regulator also includes a secondary winding 14 and a tertiary winding 16, the three windings being magnetically coupled together by a laminated core 18. Core 18 is preferably provided with magnetic shunts 19 and 20 across the primary and secondary windings with gaps, as indicated. The secondary winding 14 has a tap 15 and is connected to a starting circuit 21 for providing high voltage pulses for starting a discharge lamp. The starting circuit itself can be a conventional circuit and will not be further described herein. The secondary winding is also connected to a lamp socket 22 for receiving a discharge lamp, the operation of which is to be controlled.

A series circuit 23 is connected across the ends of winding 14, the series circuit including a radio frequency choke (RFC), a diode and a capacitor, in that order. The junction between the diode and capacitor is connected to a metallic fixture 17 which contains the discharge lamp. With the diode poled in the proper direction, a DC potential appears on the fixture which is the same polarity as the ions in the discharge lamp. This produces an electric field which confines the ions in the lamp, reducing the normal tendency of those ions to escape through the walls of the lamp.

Tertiary winding 16 is the capacitor winding of the regulator and a capacitor 24 is connected between the ends of the winding. Winding 16 is provided with a tap 26. The entire winding could be used; however, a tap 26 placed at the 240 volt location on the winding allows a standard 240 volt reactor to be used for the dimming reactor.

In accordance with the invention, a dimming inductive reactor 30 is connected in series circuit relationship with a switchable conductive path comprising a normally closed contact set 32, the series circuit thus being across one-half of winding 16, i.e., between one end of winding 16 and the center tap 26 of that winding. An electromagnetic actuator in the form of a relay winding 28 operates the contact set, the relay winding being energized in the embodiment of FIG. 1 from a relay control 29. When contact set 32 is open, reactor 30 has no effect on circuit operation. Energy is extracted from the line through the magnetic coupling and passed to capacitor 24 which typically has a value of about 19 microfarads. Energy stored in the capacitor is then passed on to the lamp.

When the contact set is closed, reactor 30 extracts positive volt-amperes and stores that energy each half-cycle, thus reducing the amount of capacitor stored energy available to be passed on to the lamp load with the result that the lamp is dimmed. As will be recognized, the contact set can be replaced by a bidirectionally conductive semiconductor switch and the relay winding by a suitable conventional trigger circuit.

Reactor 30 can be a small reactor, compared with the magnetic regulator. Typically, a standard ballast reactor designed for use with an HID lamp is suitable, the actual size of the unit being selected on the basis of the dimming required. For example, tests have showed that a 200 W HPS reactor employed as the dimming reactor for a 400 W regulator and lamp provides a 30% reduction in lamp wattage, a 27% reduction in input wattage and approximately a 50% reduction in output lumens from the hot lamp. A tapped dimming reactor can be used to provide a choice of dimmed light levels to the user.

Figure 2:
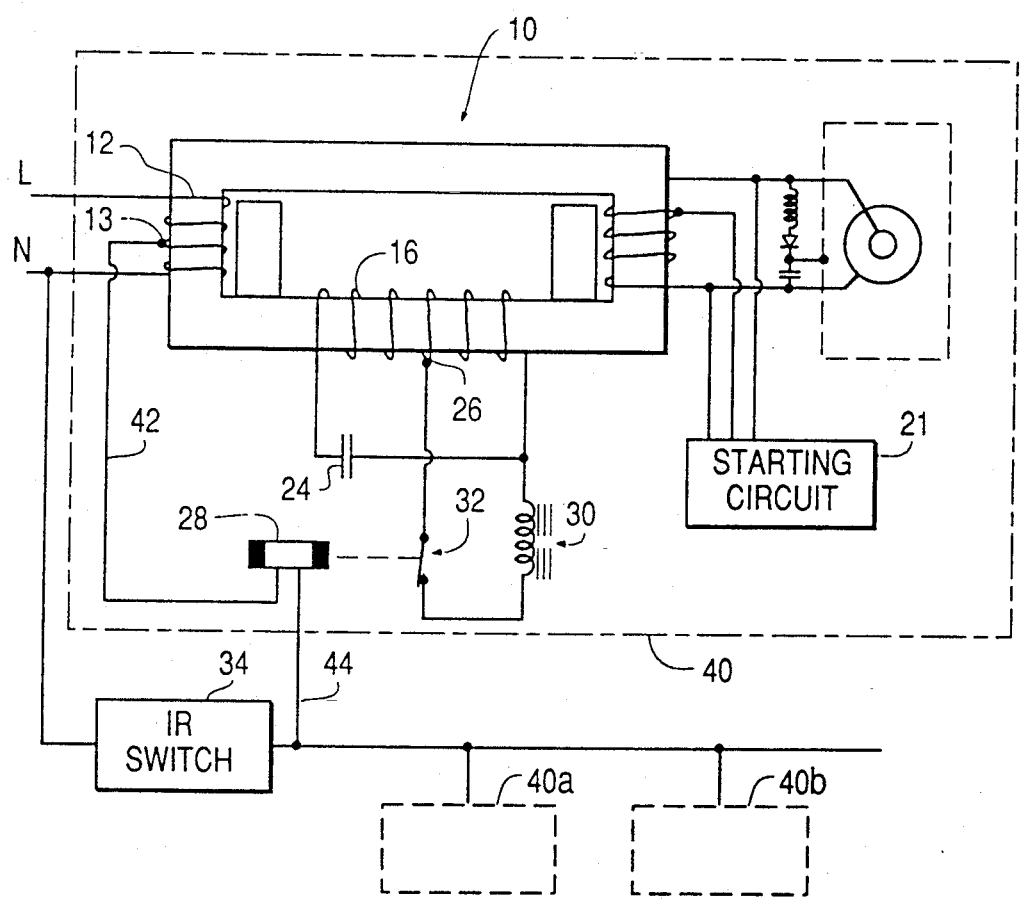
FIG. 2 is a schematic circuit diagram, partly in block form, of a second embodiment of a regulator circuit in accordance with the invention.

FIG. 2 shows a similar dimming circuit wherein the control for the relay is a switch 34 which can be of a type capable of responding to a sensed condition such as the motion of a person in a space illuminated by the lamp or by a number of lamps. Each lamp and dimming unit 40 has its own relay winding and contact set with one terminal of the relay winding connected by a wire 42 to tap 13 of the primary winding 12. This tap voltage magnitude can be selected at 120 volts to allow the use of 120 V. parts. Alternatively, 24, 12 or 6 V. can be used if a low voltage control wire is desired with the same voltage relay and other components appropriately scaled to the selected voltage. The other terminal of the relay winding is connected to a single control wire 44 which can simply be grounded or connected to neutral in order to energize the relay and open the contact set, thereby allowing the lamp to operate at its brightest level.

Switch 34 is preferably an infrared responsive sensor which reduces its internal resistance to near zero when a live human body moves in the area of its sensitivity. A device suitable for the purpose is the Model WSS-120 sensor switch marketed by Hubbell Incorporated of Bridgeport, Conn. When the switch produces a low resistance connection internally in response to motion, wire 44 is connected to neutral, energizing relay 28. Thus, when a person is present in the space monitored by IR switch 34, the relay is energized and the lamp is at full brightness. When the space is unoccupied, the lamp returns to its dimmed level. A plurality of lamp and dimmer units 40a, 40b, etc. can be connected to the same switch by a single wire, allowing the lighting in a large area to be automatically dimmed when it is unoccupied. Switch 34 can also be manually operated or have a manual override.

Figure 3:
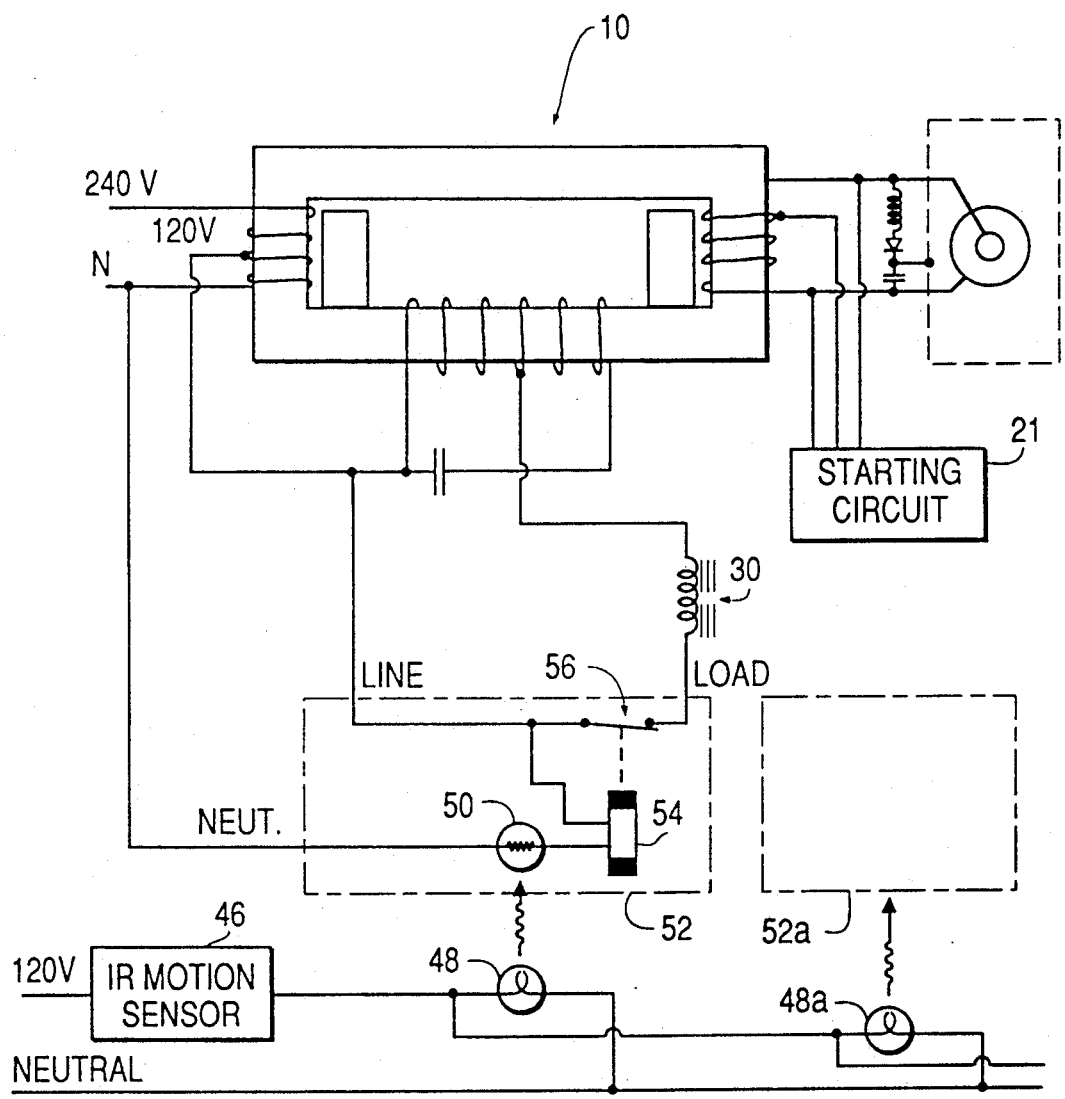
FIG. 3 is a schematic circuit diagram, partly in block form, of a further embodiment of regulator circuit in accordance with the invention wherein the dimming function is motion responsive.

FIG. 3 shows a further embodiment which also uses a motion responsive switch but isolates the switch from the reactive circuits. Some motion responsive switches are sensitive to electrical "noise" which is generated on the line by the operation of a highly inductively reactive magnetic circuit such as the regulator shown in FIG. 1-3. This noise includes spikes and harmonics of the line voltage and can cause the motion sensor to malfunction. In the embodiment of FIG. 3, motion sensor 46 is connected in series with a low-wattage lamp 48 between a 120 VAC source and neutral or ground. By "low wattage" is meant a lamp having a rated wattage of less than about 20 watts. A light emitting diode (LED) or a small lamp of the filament type is suitable. Lamp 48 is positioned so that light which it produces illuminates the photo-responsive surface of a photocell such as a cadmium sulfide (CdS) cell 50 in a photoelectric control device 52. A phototransistor or photodiode can also be used. Device 52 is a control of the type used in street lighting applications and is capable of switching inductive loads up to 1800 VA and includes a relay winding 54 in series with the CdS cell and a normally closed contact set 56 operated by the relay. The device is a three-terminal device with the terminals typically identified as "line", "load" and "neutral". Connecting the "line" terminal to tap 13 and to one end of winding 16, the "load" terminal to dimming reactor 30 and the "neutral" terminal to the neutral side of primary winding 12 results in a circuit arrangement as shown in FIG. 3 wherein reactor 30 and contact set 56 are in series across the tertiary winding, as in the other embodiments.

When sensor 46 senses motion of a person in the monitored space, its internal resistance drops to near zero and lamp 48 is energized, illuminating CdS cell 50 and energizing relay winding 54. Contact set 56 is thereby opened and reactor 30 is functionally removed from the circuit, allowing the lamp to operate at full brightness. After motion is no longer sensed, lamp 48 is extinguished and the relay returns the lamp to its dimmed condition.

As indicated in FIG. 3, additional lamps 48a, etc., can be connected to the motion sensor to operate one or more additional photocell units 52a, etc., and their associated lighting units. Also, the photocell-operated relay can be replaced by a solid state switch.

As will be recognized from the above, operating the lighting units in the fashion described allows them to function at a fraction of their rated power for intervals of time for long life and reliability as well as energy conservation. The circuits described herein can be added to the lighting units at very small cost, which is quickly recovered from the energy saved, and the added circuits are in themselves robust and dependable. Additionally, the power factor of the overall circuit remains high, even when the circuit is operating at a greatly dimmed level.

Figure 3A:
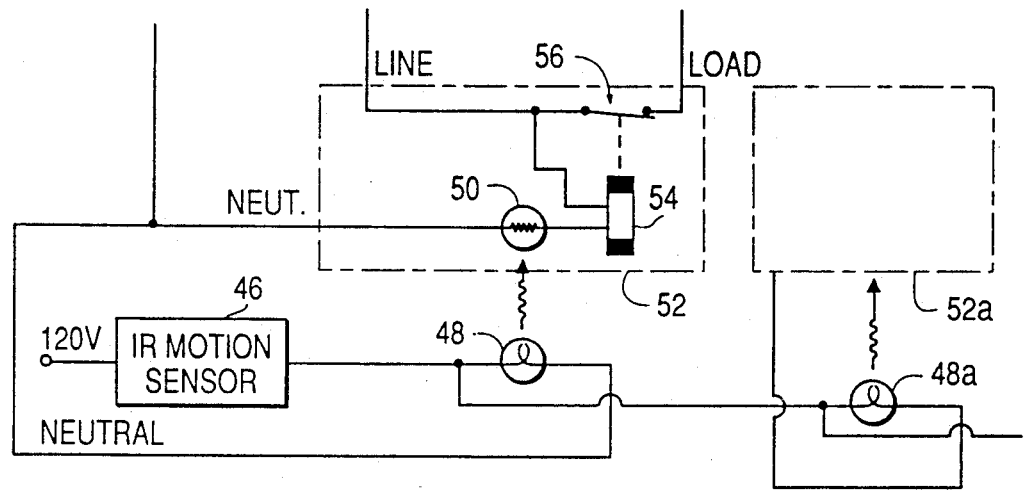
FIG. 3A is a schematic diagram of a portion of a circuit usable in the embodiment of FIG. 3 with single-wire control of a plurality of lamp units.

FIG. 3A shows the lower portion of the diagram of FIG. 3 with a modified wiring arrangement which permits running a single control wire from the IR sensor to the lamps. The neutral side of each lamp 48, 48a, etc., is connected to the neutral side of the primary winding of its associated lamp unit by a wire 49, 49a, etc., so that only the high side of the control from sensor 46 need be connected to each lamp. This reduction of the control wiring between lamps results in very significant saving when a large number of lamps is spaced over a large area in, for example, a large warehouse room. The remainder of the circuit is the same as in FIG. 3.

Figure 4:
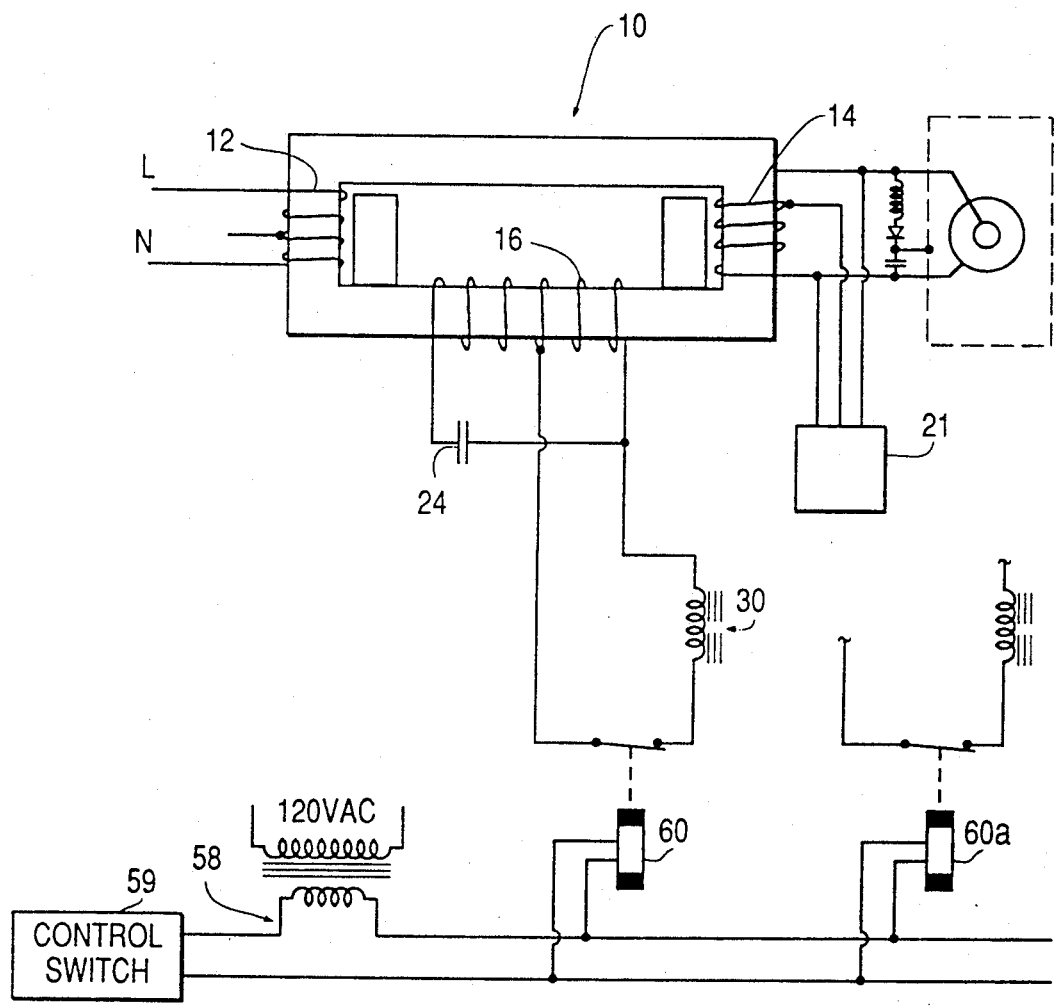
FIG. 4 is a schematic circuit diagram of a further embodiment of a dimming control for a plurality of lamp units.

FIG. 4 shows an embodiment in which dimming of a plurality of lamp units is accomplished using a low voltage relay circuit which is advantageous under some circumstances. A step-down transformer 58 has a primary winding connected to a 120 VAC source and a secondary winding of fewer turns than the primary to produce a low voltage, i.e., significantly less than 120 V, for example, 12 VAC. A control switch 59 is connected in series with the secondary winding of transformer 58 and a plurality of relays 60, 60a, etc., are connected across the control switch/transformer circuit in a parallel array. Each relay can thus be a low-voltage relay and the wiring can be low voltage wiring. Otherwise, the circuit connection and function can be as discussed in connection with the other embodiments.

Figure 5:
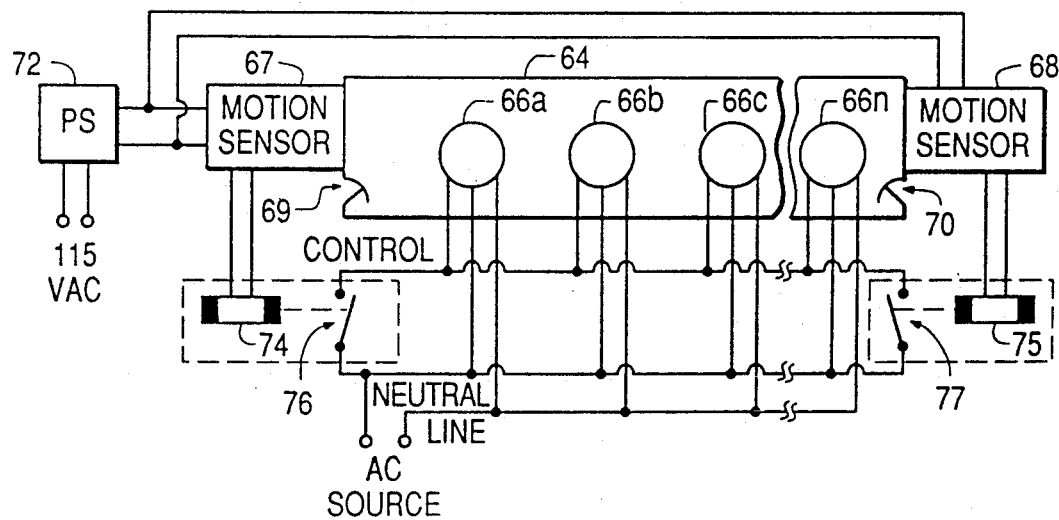
FIG. 5 is a schematic diagram of a room or the like showing an arrangement of sensors and lamp units in accordance with the invention.

FIG. 5 illustrates an arrangement of sensors and lamp units in a room or aisle 64 which is being monitored and lighted. A typical application for a system such as that shown is in a warehouse or other storage area. Along a wall or ceiling of room 64 are regulator and lamp units 66a, 66b, . . . 66n, in accordance with the foregoing figures, each having a regulator, lamp dimming reactor and switchable conductive path as previously discussed. Motion sensors 67 and 68 are positioned in the room at opposite ends, typically near entrances 69 and 70 to the room. The sensors are connected to the control for the switchable conductive paths of the lamp fixtures in such a way that motion sensed by either sensor causes the dimming reactors to be removed from the circuit, allowing the light output from all of the lamps in the room to be increased promptly.

Specifically, a power supply 72 is connected to a line voltage source such as 115 VAC and supplies a low DC voltage, such as 15 volts DC to motion sensors 67 and 68. The sensors can be, for example, model 852C motion sensors made by Eltec Instruments, Inc., of Daytona Beach, Fla. These sensors have a viewing angle of about 40° and a sensing range of about 70 feet which means that two sensors positioned as shown can monitor a room about 140 feet long. More than two can, of course, be used. The model 852C sensors produce an output of 120 VAC when motion is sensed and they also have a built-in delay which is adjustable so that the output lasts for a selectable length of time after motion within the field of view of the device ceases.

Each motion sensor provides its output to the energizing winding of a relay, sensor 67 controlling relay 74 and sensor 68 controling relay 75. The relays have normally open contact sets 76 and 77, respectively, which are closed when the relays are energized. Fixtures 66a, 66b, . . . 66n are connected in parallel to the line ("hot") and neutral conductors of a lighting AC source. Each fixture has an internal power supply relay such as relay 28 in the circuit of FIG. 2 with a control line equivalent to control line 44 of FIG. 2 emerging therefrom. The control lines of all of the fixtures are connected to one contact of contact sets 76 and 77, the other contact of each of those contact sets being connected to neutral. As in FIG. 2, one terminal of each of the internal relays 28 is connected to the AC line so that when the other (control) terminal is connected to neutral, the relay is energized. Contact sets 76 and 77 thus perform the control function perfed by IR switch 34 in the circuit of FIG. 2.

In operation, if either of sensors 67 and 68 detects motion in the space 64, at least one of relays 74 or 75 is energized by the sensor output, closing contact set 76 or 77. This connects the control line for all fixtures to neutral, energizing the internal relay in each fixture and removing the internal ballast in each fixture from the lamp circuit. The light output from each lamp is thus caused to abruptly increase, fully lighting the space. When motion ceases, and after any delay in the sensor, the relays are deenergized, contact sets 76 and 77 open and the light output from the fixtures again drops to its lower level.

FIG. 7 is a table showing test results using a number of different reactors. The reactors are standard items designed for use as ballast reactors for discharge lamps of various types and wattages. The fact that these standard reactors can be used as dimming reactors in connection with regulators as shown herein is a considerable economic advantage since no special parts need be produced. The changes in light output and other characteristics of the lamp operation are shown.

An advantageous application of the invention is to employ the dimmer to reduce light output when sufficient daylight exists to warrant full illumination unnecessary. For this "daylighting" application, the control wire for the dimming control is connected to a photocell or the like exposed to ambient natural light. With high sunlight entry, the fixture or fixtures automatically dim, thus saving energy.

FIG. 8 graphically represents some of the data from FIG. 7, showing the light dimming effects with the various reactors.

While certain advantageous embodiments have been chosen to illustrate the invention, it will be understood by those skilled in the art that various changes and modifications can be made therein without departing from the scope of the invention as defined in the appended claims.

What is claimed is:

1. A step-dimming system for a discharge lamp comprising the combination of:
   a discharge lamp
   a magnetic regulator having first, second and third windings and a magnetic core linking said windings,
   said first winding being connectable to a source of alternating current,
   said second winding and a starting circuit being connected to said discharge lamp for delivering energy from said source to said discharge lamp to thereby cause said discharge lamp to light,
   said third winding having a ballast capacitor connected across said winding and a tap;
   an inductive reactor and switch means having a switchable conductive path connected in series circuit relationship with each other, said reactor and switch means being connected between one end of said third winding and said tap so that when said path is conductive, said reactor stores energy from said capacitor and reduces the power available for said discharge lamp, abruptly reducing the light output from said discharge lamp, said switch means including a normally closed contact set in series with said reactor and an energizable electromagnetic actuator for opening said contact set upon energization; and circuit means for controlling the energization of said actuator, thereby opening said circuit including said inductive reactor and abruptly increasing the light output from said discharge lamp.

2. A system according to claim 1 wherein said switch means comprises means responsive to the presence of a person.

3. A system according to claim 2 wherein said circuit means includes a motion sensor and a low-wattage lamp connected to a source of power such that detection of motion lights said low-wattage lamp, a photocell connected to said actuator and exposed to said low-wattage lamp so that when said low-wattage lamp is lighted, said photocell causes said actuator to open said contact set, thereby increasing the light output from said discharge lamp.

4. A system according to claim 3 wherein said first winding has one end connected to a neutral line of said source and another end connected to an high voltage line, and wherein one terminal of said motion sensor is connected to a source of power, another terminal of said motion sensor is connected to one terminal of said low-wattage lamp and the other terminal of said low-wattage lamp is connected to said neutral line.

5. A system according to claim 1 wherein said circuit means includes means responsive to the presence of a person in a selected area to render said switchable path non-conductive including a motion sensor and a low-wattage lamp connected to a source of power such that detection of motion lights said low-wattage lamp, a photocell connected to said actuator and exposed to said low-wattage lamp so that when said low-wattage lamp is lighted, said photocell causes said actuator to open said contact set, thereby increasing the light output from said discharge lamp.

6. A system according to claim 5 wherein said first winding has one end connected to a neutral line of said source and another end connected to an high voltage line, and wherein one terminal of said motion sensor is connected to a source of power, another terminal of said motion sensor is connected to one terminal of said low-wattage lamp and the other terminal of said low-wattage lamp is connected to said neutral line.

7. A system according to claim 1 wherein said lamp is mounted in a fixture having an electrically conductive surface, said system further comprising means connected to said second winding for producing a DC voltage having a polarity the same as an ionized gas in said discharge lamp and for connecting said DC voltage to said fixture to produce an electric field between said fixture and said lamp for inhibiting ion loss from said lamp.

8. A system according to claim 2 wherein
said first winding has a tap and a neutral line,
said switch means comprises a normally closed contact set and an energizable electromagnetic actuator for opening said contact set upon energization,
said actuator is connected between said tap and one terminal of said motion responsive switch, and
another terminal of said motion responsive switch is connected to said neutral line.

9. A system according to claim 2 and including a photocell unit containing said normally closed contact set, said actuator comprising a relay winding energizable to open said contact set and a photo-responsive device with an exposed photo-responsive surface, and wherein said means responsive to the presence of a person includes a motion-responsive device and a low-wattage lamp connected to produce light when said device detects motion of a person in said area, said low-wattage lamp being positioned to illuminate said photo-responsive surface to energize said relay winding.

10. A step-dimming system for a plurality of discharge lamps positioned to illuminate a space, the system comprising the combination of
a plurality of discharge lamp units, each said lamp unit comprising
a discharge lamp;
a magnetic regulator having first, second and third windings and a magnetic core linking said windings,
said first winding being connectable to a source of alternating current,
said second winding and a starting circuit being connected to said discharge lamp for delivering energy from said source to said discharge lamp to thereby cause said discharge lamp to light,
said third winding having a ballast capacitor connected across said winding and a tap, and
an inductive reactor, a normally closed contact set connected in series circuit relationship with said reactor and a relay winding energizable to open said contact set, said reactor and contact set being connected between one end of said third winding and said tap so that when said contact set is closed, said reactor stores energy from said capacitor and reduces the power available for said discharge lamp, reducing the light output from said discharge lamp; and
circuit means for selectively energizing said relay windings in said lamp units, said circuit means including means responsive to the presence of a person in a selected area and a transformer having a low voltage output in response to detection of a person, said low voltage output being connected to each said relay winding, thereby opening said circuit including said inductive reactor and abruptly increasing the light output from each said discharge lamp when the presence of a person is detected.

11. A system according to claim 10 wherein one end of said first winding in each lamp unit is connected to a neutral line, wherein each of said lamp means comprises a two-terminal low-wattage lamp, wherein one terminal of each said low-wattage lamp is connected to the neutral line of its associated lamp unit and wherein said means responsive to the presence of a person comprises a motion sensor connected to the other terminals of the lamps operatively associated therewith by a single wire.

* * * * *